United States Patent
Boss et al.

(10) Patent No.: US 10,733,681 B2
(45) Date of Patent: Aug. 4, 2020

(54) PRECISE ANTICIPATORY HOTEL ROOM ENTRY SYSTEM

(71) Applicant: International Business Machines Corporation, Armonk, NY (US)

(72) Inventors: Gregory J. Boss, Saginaw, MI (US); James E. Bostick, Cedar Park, TX (US); John M. Ganci, Jr., Cary, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 15/427,246

(22) Filed: Feb. 8, 2017

(65) Prior Publication Data

US 2018/0225780 A1   Aug. 9, 2018

(51) Int. Cl.

| | | |
|---|---|---|
| *G06Q 50/12* | (2012.01) | |
| *H04W 12/06* | (2009.01) | |
| *G06K 9/00* | (2006.01) | |
| *G07C 9/00* | (2020.01) | |
| *H04W 12/00* | (2009.01) | |
| *H04W 4/029* | (2018.01) | |
| *H04W 4/33* | (2018.01) | |

(Continued)

(52) U.S. Cl.
CPC ......... *G06Q 50/12* (2013.01); *G06K 9/00295* (2013.01); *G06K 9/00778* (2013.01); *G07C 9/00904* (2013.01); *G07C 9/27* (2020.01); *G07C 9/28* (2020.01); *H04W 4/029* (2018.02); *H04W 4/33* (2018.02); *H04W 12/00503* (2019.01); *H04W 12/00508* (2019.01); *H04W 12/06* (2013.01)

(58) Field of Classification Search
CPC ........ G06Q 10/02; G06Q 50/12; G06Q 30/02; G06Q 30/00; G06Q 10/06; G06Q 30/0261; G07C 9/00111; G07C 9/00904; G07C 9/00309; G07F 17/3237; G05D 23/1951; H04W 12/08; H04B 5/0043
See application file for complete search history.

(56) References Cited

U.S. PATENT DOCUMENTS

| | | |
|---|---|---|
| 7,202,868 B2 | 4/2007 | Hao et al. |
| 2014/0049367 A1 | 2/2014 | Ahearn et al. |

(Continued)

FOREIGN PATENT DOCUMENTS

| | | |
|---|---|---|
| WO | WO2016109839 A1 | 7/2016 |
| WO | WO2016191768 A1 | 12/2016 |

OTHER PUBLICATIONS

Anthony, "You can now open hotel rooms with just your smartphone—and bypass check-in, too", ExtremeTech, Nov. 3, 2014, 7 pages. http://www.extremetech.com/extreme/193450-you-can-now-open-hotel-rooms-with-just-your-smartphone-and-bypass-check-in-too.

*Primary Examiner* — Christine M Behncke
*Assistant Examiner* — Michael R Koester
(74) *Attorney, Agent, or Firm* — Yee & Associates, P.C.

(57) ABSTRACT

A method, system, and computer program product for managing hotel operations. The method comprises using a hotel computer system to track the locations of a guest in a hotel over time through a mobile device for the guest. The hotel computer system identifies a pattern of movement in the hotel using the locations tracked over time. The hotel computer system preforms an action in the hotel enabling managing the hotel operations for the hotel.

11 Claims, 6 Drawing Sheets

(51) Int. Cl.
  *G07C 9/27* (2020.01)
  *G07C 9/28* (2020.01)

(56) References Cited

U.S. PATENT DOCUMENTS

| | | | |
|---|---|---|---|
| 2015/0073980 A1* | 3/2015 | Griffin | H04W 12/04031 |
| | | | 705/39 |
| 2015/0227926 A1* | 8/2015 | Grigg | G06Q 20/32 |
| | | | 705/64 |
| 2015/0348049 A1* | 12/2015 | Todasco | G06Q 10/02 |
| | | | 705/5 |
| 2016/0307380 A1* | 10/2016 | Ho | G07C 9/00079 |
| 2017/0115018 A1* | 4/2017 | Mintz | G06N 5/022 |
| 2017/0116561 A1* | 4/2017 | Saddler | G06Q 10/063116 |
| 2017/0263065 A1* | 9/2017 | Johnson | G07C 9/00309 |
| 2018/0040183 A1* | 2/2018 | Cheng | G07C 9/00309 |

* cited by examiner

PRECISE ANTICIPATORY HOTEL ROOM ENTRY SYSTEM

BACKGROUND

1. Field

The disclosure relates generally to an improved data processing system, and more specifically, to a method, apparatus, and computer program product for managing hotel operations based on an anticipated entry into hotel rooms

2. Description of the Related Art

Some hotels employ a keyless entry system for entering hotel rooms. These hotels may allow a guest to unlock the door to their hotel room using a mobile application on their device. These types of systems often use a near or medium field communication technology to communicate with door locks or receivers in other locations in the hotel.

For example, a digital hotel key mobile application may send a token to a receiver on a hotel door. This token is sent in encrypted form to a central server for the hotel system for authentication and authorization. The token is sent over a near field communication technology or a Bluetooth signal. The hotel room door is unlocked using the token in an authentication and authorization process.

SUMMARY

An embodiment of the present disclosure provides for a method, system, and computer program product for managing hotel operations. The method comprises tracking locations of a guest in a hotel over time through a mobile device for the guest, using a hotel computer system. The hotel computer system identifies a pattern of movement in the hotel using the locations tracked over time and preforming an action in the hotel enabling managing the hotel operations for the hotel. The hotel computer system comprises a processor unit and an arrival manager. The arrival manager tracks the locations of the guest in the hotel over time through the mobile device for the guest and identifies the pattern of movement in the hotel using the locations tracked over time. The arrival manager performs an action in the hotel enabling managing the hotel operations for the hotel. The computer program product provides a computer-readable storage media, a first program code, a second program code, and a third program code, all stored on the computer-readable storage media. The first program code tracks the locations of the guest in the hotel over time through the mobile device for the guest. The second program code identifies, through the hotel computer system, the pattern of movement in the hotel using the locations tracked over time. The third program code performs the action in the hotel enabling managing the hotel operations for the hotel.

DETAILED DESCRIPTION

Figure 1:
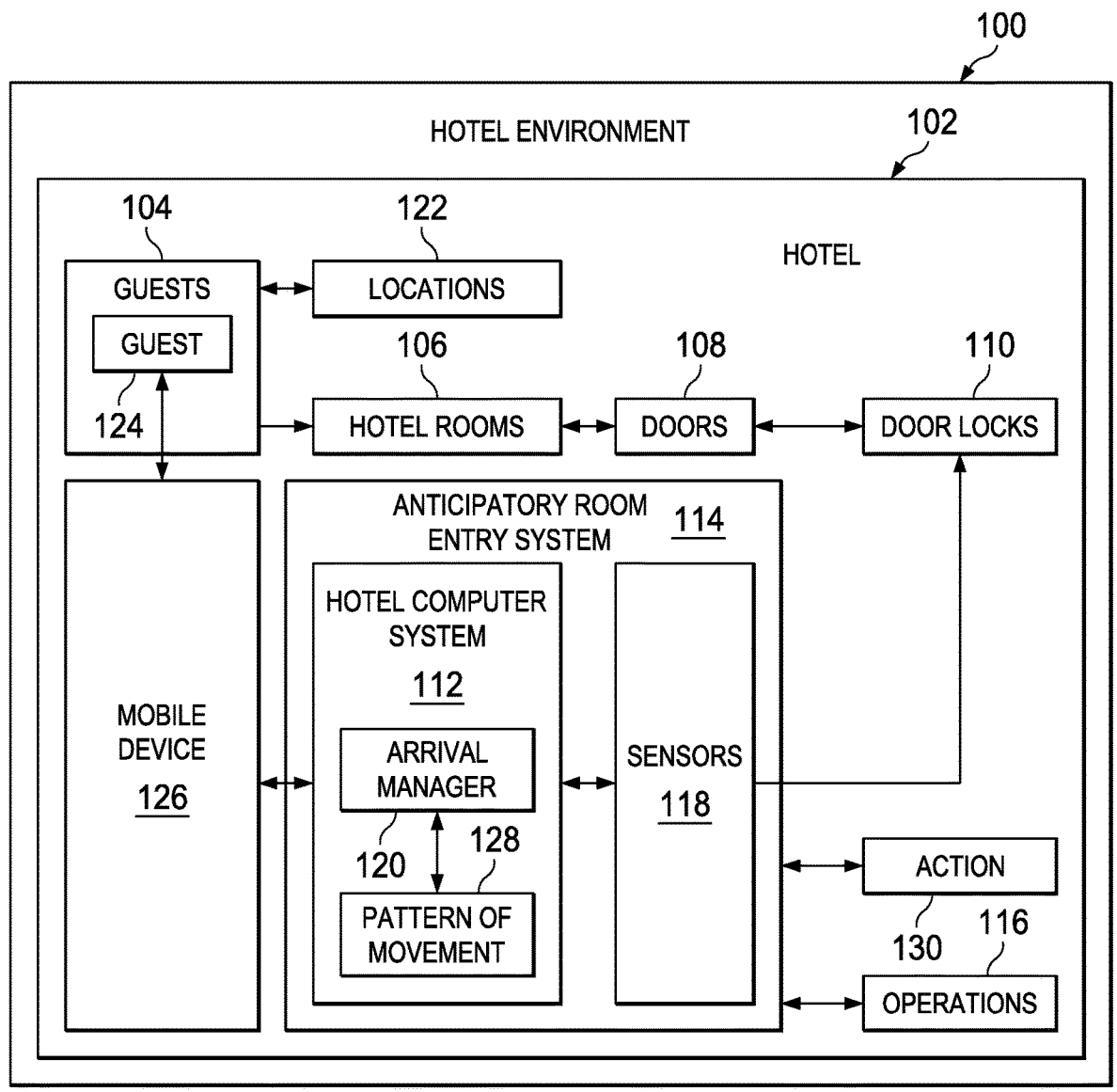
FIG. 1 is block diagram of a hotel environment in accordance with an illustrative embodiment.

The present invention may be a system, a method, and/or a computer program product. The computer program product may include a computer-readable storage medium or media, having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing devices. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may run the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems,) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which are processed on the computer, other programmable apparatus, or other device implement the functions or acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function or functions. In some alternative implementations, the functions noted in the blocks may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or carry out combinations of special purpose hardware and computer instructions.

The illustrative embodiments recognize and take into account that it would be desirable to have a method and apparatus that allows managing operations in a hotel based on anticipating when a guest will return to a room. The illustrative embodiments recognize and take account that increasing the accuracy of detecting the movement of the guest in the hotel may increase the ability to manage hotel operations. With reference now to the figures and, in particular, with reference to FIG. 1, an illustration of a hotel environment is depicted in accordance with an illustrative embodiment. As depicted, hotel environment 100 includes hotel 102 in which guests 104 are present. Guests 104 may enter hotel rooms 106 in hotel 102 in which hotel rooms 106 have doors 108 with door locks 110 controlled by hotel computer system 112. In this illustrative example, hotel rooms 106 include the guest rooms in which guest 124 may sleep. Hotel rooms 106 may also include other rooms, such as a conference room, a business center, a dining room, a spa, a gym, or other suitable room for which guest 124 is authorized to have access.

In this illustrative example, hotel computer system 112 is designed to predict the arrival for guests 104 in hotel 102 to hotel rooms 106. The arrival includes a time at which guests 104 are predicted to arrive at hotel rooms 106. As depicted, hotel computer system 112 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable type of data processing system.

In the illustrative example, anticipatory room entry system 114 is used to manage operations 116 in hotel 102. Operations 116 may be selected from at least one of maintenance, cleaning, appliance operation, system operation, or other suitable types of operations that may be performed in hotel 102 for guests 104. In this illustrative example, arrival manager 120 in hotel computer system 112 and sensors 118 are part of anticipatory room entry system 114.

Sensors 118 may take various forms. For example, sensors 118 may include at least one of receivers for door locks 110, transceivers for door locks 110, cameras, motion sensors, and other suitable types of sensors.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations of items.

In this illustrative example, arrival manager 120 in anticipatory room entry system 114 performs a number of different operations in managing operations 116 in hotel 102.

As depicted, arrival manager 120 in hotel computer system 112 and anticipatory room entry system 114 tracks locations 122 of guest 124 in a hotel over time through mobile device 126 for guest 124. In this illustrative example, locations 122 may be identified using at least one of two-dimensional or three-dimensional coordinates.

Mobile device 126 is a data processing system that may be worn or carried by guest 124, and may take a number different forms. For example, mobile device 126 may be selected from one of a mobile phone, a tablet computer, a smart watch, or some other suitable type of device. Mobile device 126 is considered to be for guest 124 when mobile device 126 is registered or identified with arrival manager 120 as belonging to guest 124. As depicted, mobile device 126 performs a registration process with arrival manager 120 when entering or located in hotel 102 in these illustrative examples.

The registration of mobile device 126 may be performed any number of different ways. For example, guest 124 may register their mobile device with arrival manager 120, install an application, and turn on the needed communications system to communicate with arrival manager 120 in hotel computer system 112 in hotel 102.

In some examples, a guest may set up options via a computer or mobile device that allows the guest to setup some configurable capabilities, such as turning on and off a hotel system for the room, setting up warnings for other users about to enter the room, when to turn on or off certain appliances, and other suitable options.

As depicted, arrival manager 120 identifies pattern of movement 128 in hotel 102 for guest 124 using locations 122 tracked over time. Action 130 is performed in the hotel, enabling managing operations 116 for the hotel 102.

Arrival manager 120 may be implemented in software, hardware, firmware, or a combination thereof. When software is used, the processes performed by arrival manager 120 may be implemented in program code configured to run on hardware, such as a processor unit. When firmware is used, the processes performed by arrival manager 120 may be implemented in program code and data and stored in persistent memory to run on a processor unit. When hardware is employed, the hardware may include circuits that operate for processes in arrival manager 120.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

The illustrative embodiments recognize and take into account that a technical problem is present with identifying the movement patterns for guests. The embodiments recognize and take into account that current techniques for identifying movement patterns are not as precise or accurate as desired. For example, the accuracy in predicting at least one of when and where a guest will move or travel in the hotel is not as great as desired in performing actions in the hotel.

In one illustrative example, one or more technical solutions are present that overcome a technical problem with identifying the movement patterns for guests in the hotel with an accuracy that allows for managing operations in the hotel. By increasing accuracy in which the movement of guests can be at least one of identified or predicted, an enhanced experience may be provided for guests in the hotel. For example, operations in a hotel such as maintenance, cleaning, environmental control, or other operations may be managed in a manner to increase the enjoyment of the hotel experience for guest. The illustrative embodiments recognize and take account that use of sensors in hotel 102 such as sensors 118 in door locks 110 may be used to detect patterns of guests by detecting the locations as they passed by sensors 118. The illustrative embodiments recognize and take account that this detection may be performed without needing a Wi-Fi network. Instead, near field or medium field communication systems may be used to detect the presence of guests 104 carrying mobile devices that are registered with arrival manager 120 in hotel computer system 112.

As a result, hotel computer system 112 operates as a special purpose computer system in which arrival manager 120 in hotel computer system 112 enables managing operations 116 in hotel 102. In particular, arrival manager 120 transforms hotel computer system 112 into a special purpose computer system as compared to currently available general computer systems that do not have arrival manager 120.

Figure 2:
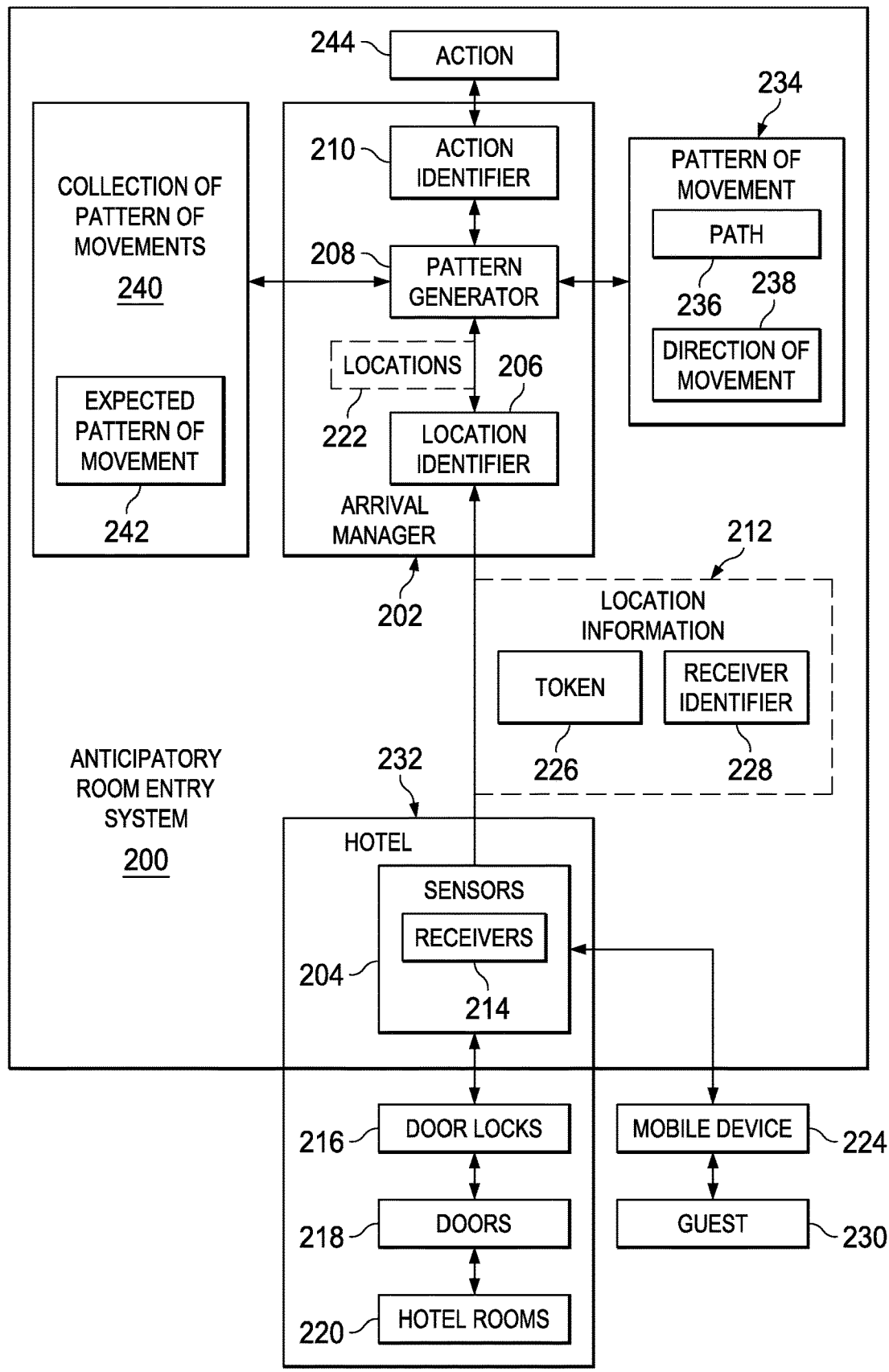
FIG. 2 is a block diagram illustrating data flow in managing hotel operations in accordance with an illustrative embodiment.

Turning next to FIG. 2, a block diagram illustrating data flow in managing hotel operations is depicted in accordance with an illustrative embodiment. In this illustrative example, anticipatory room entry system 200 is an example of an implementation of anticipatory room entry system 114 in FIG. 1. In this illustrative example, anticipatory room entry system 200 comprises arrival manager 202 and sensors 204.

Arrival manager 202 is an example of one implementation for arrival manager 120 in FIG. 1. In this example, arrival manager 202 includes location identifier 206, pattern generator 208, and action identifier 210.

As depicted, location identifier 206 and arrival manager 202 receives location information 212 from sensors 204. In this illustrative example, sensors 204 in anticipatory room entry system 200 comprises sensors 204 for door locks 216 for doors 218 in hotel rooms 220. For example, sensors 204 for door locks 216 may include receivers 214. Receivers 214 send location information 212 in a form that allows location identifier 206 to identify locations 222 for mobile device 224.

For example, location information 212 may include token 226 and receiver identifier 228. Token 226 is received from mobile device 224 and is used to identify guest 230. Receiver identifier 228 is an identifier for a receiver in receivers 214 and uniquely identifies the receiver from other receivers in receivers 214. With the identification of the receiver, and location of the receiver made in this location, may be used to identify the location for mobile device 224 used by guest 230. In this manner, locations 222 of guest 230 may be identified over time from receivers 214 for door locks 216 in hotel 232 detecting mobile device 224 for guest 230.

Pattern generator 208 identifies pattern of movement 234 for guest 230 using locations 222 identified over time. For example, pattern generator 208 identifies path 236 using locations 222 to form pattern of movement 234. In the illustrative example, pattern of movement 234 also may include direction of movement 238.

Pattern generator 208 may add pattern of movement 234 to collection of patterns of movement 240 for guest 230. As depicted, collection of patterns of movement 240 are a history of patterns of movement for guest 230.

Collection of patterns of movement 240 may be grouped based on activities for guest 230. Collection of patterns of movement 240 may be used to identify expected pattern of movement 242 for guest 230.

For example, a portion of collection of patterns of movement 240 may be for when guest 230 returns to a hotel from a meeting. In another illustrative example, another portion of collection of patterns of movement 240 may be for when guest 230 returns from a dining room or workout facility in hotel 232.

In the illustrative example, pattern of movement 234 also may be compared to collection of patterns of movement 240. This comparison may be made to determine whether pattern of movement 234 deviates more than desired from expected pattern of movement 242 in collection of patterns of movement 240. This comparison may be part of action 244 performed by action identifier 210. Further, action 244 may include authenticating guest 230 through mobile device 224 when pattern of movement 234 deviates from expected pattern of movement 242.

Figure 3:
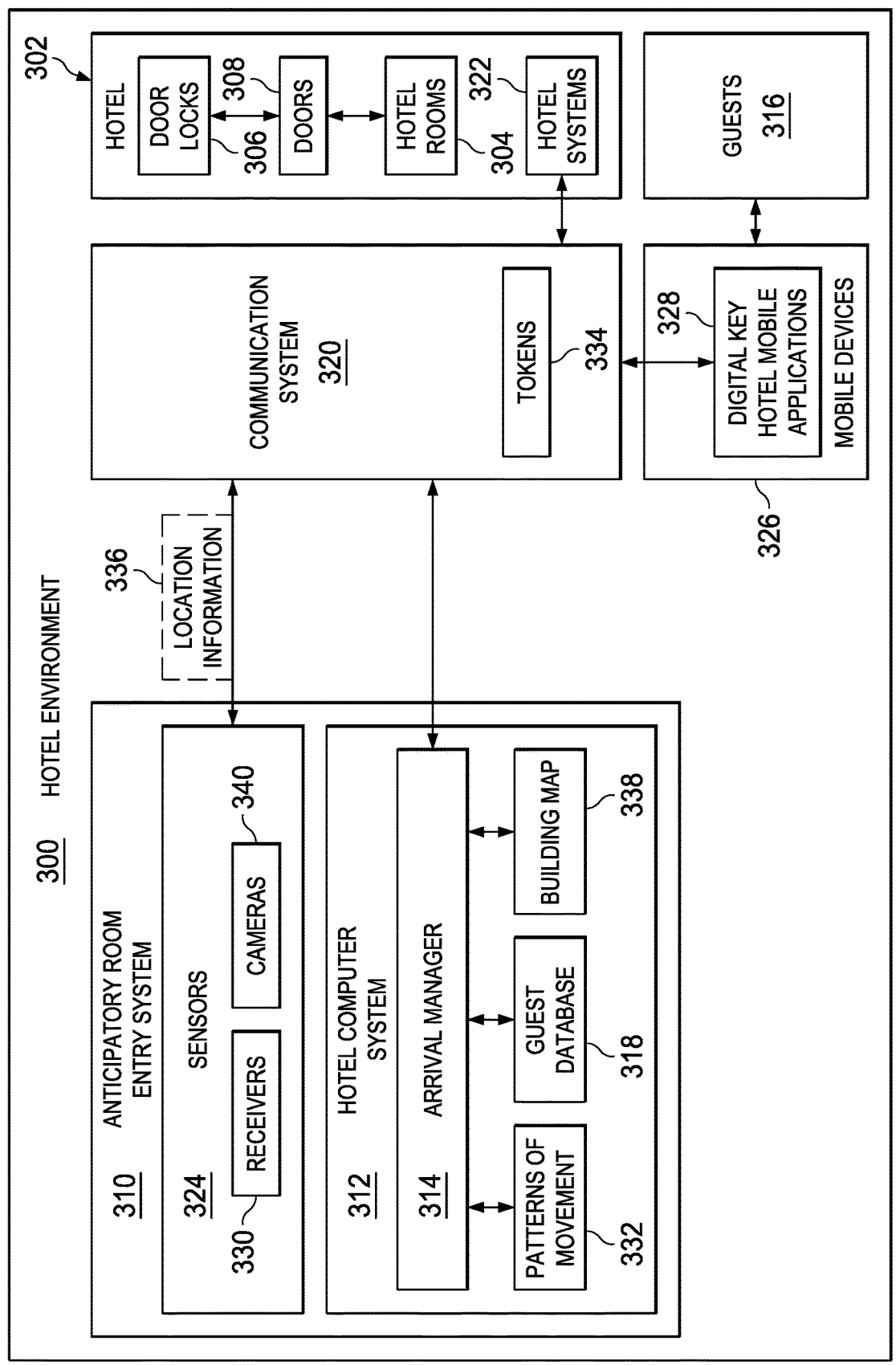
FIG. 3 is a block diagram of a hotel environment in accordance with an illustrative embodiment.

With reference to FIG. 3, a block diagram of a hotel environment is depicted in accordance with an illustrative embodiment. As depicted, hotel environment 300 includes hotel 302 having hotel rooms 304 to which access is controlled by door locks 306 on doors 308.

As depicted, anticipatory room entry system 310 includes hotel computer system 312 with arrival manager 314. Hotel computer system 312 with arrival manager 314 provides for central processing of information about guests 316. This information includes, for example, at least one a room number, a registered mobile device, a name, address, phone number, email address, and other suitable information that may be used to enhance the stay of guests 316 at hotel 302. As depicted, this information is stored in guest database 318.

In this illustrative example, communication system 320 is used by arrival manager 314 to communicate with hotel systems 322, sensors 324 and door locks 306. As depicted, some of sensors 324 take the form of receivers 330 associated with door locks 306. Other sensors in sensors 324 may take the form of cameras, motion detectors, or the types of sensors that may be located within or near hotel 302.

Communication system 320 may take a number of different forms. For example, communication system 320 is selected from at least one of a near field communication system, a medium field communication system, a Bluetooth communication system, an infrared communication system, a Wi-Fi system, a network, or some other suitable medium through which communications may occur. In this illustrative example, near field communications (NFC) system implements a short-range wireless connectivity standard (Ecma-340, ISO/IEC 18092) that uses magnetic field induction to enable communication between devices.

In the illustrative example, sensors 324 associated with door locks 306 for doors 308 may be configured or set to have a proximity range to allow for detection of mobile devices 326 as mobile devices 326 pass by door lock 306. The proximity range may be, for example, the width of the hallway or some other distance depending on the particular implementation. The range is set such that mobile devices 326 can be detected as mobile devices 326 pass by a particular sensor for a door lock.

As depicted, digital key hotel mobile applications 328 run on mobile devices 326. The applications transmit information between mobile devices 326 and receivers 330 in sensors 324 for door locks 306 in the illustrative example. As depicted, at least one of receivers 330 or door locks 306 communicates with arrival manager 314 using communication system 320. The communication in this example comprises the digital key hotel mobile applications 328 sending tokens 334. Tokens 334 allow for the identification of guests 316. Tokens 334 include, for example, unique identifiers for guest 316, authentication information, and other suitable types of information.

In the illustrative example, arrival manager 314 identifies patterns of movement 332 for guests 316 as their mobile devices move within range of sensors 324, such as receivers 330. This identification is performed using location information 336 received from sensors 324. Location information 336 may include, for example, at least one of a sensor identifier, global positioning system coordinates, a timestamp, or other suitable types of information. The sensor identifier is used to identify the location of a sensor. The global positioning system coordinates may be transmitted by the mobile device. This and other information may be used to identify the locations of guests 316 within hotel 302.

As depicted, when arrival manager 314 receives location information 336, arrival manager 314 identifies patterns of movement 332 for guests 316. These patterns of movement may include at least one of coordinates of locations where guests 316 were detected, a direction, a path, or other suitable types of information.

As depicted, building map 338 may be used to identify locations of sensors 324 from sensor identifiers in location information 336. For example, receivers 330, when associated with door locks 306 in doors 308, may be used to identify the proximity to various locations. These locations may include, for example, a pool, a gym, an ice machine, a vending machine, a front desk, the conference room, or other locations in hotel 302. Building map 338 locations may include distances between locations.

These locations and timestamps of when the location information is generated may be used to define the speed at which guests 316 move. This information may also be included in patterns of movement 332. This information may be used to identify a more precise time of when a guest will arrive at a particular location.

In the illustrative examples, other sensors, other than receivers 330 of door locks 306 may be present. For example, cameras 340 may also be present in sensors 324. Cameras 340 generates images. These images may be used to determine whether other people are in proximity to a guest's door. If other people are present within a selected distance for a particular door lock, arrival manager 314 may decide to lock the door even when arrival manager 314 knows the guest for the hotel room is down the hall retrieving ice. Further, facial recognition may be used increase the accuracy levels, as guests are associated with known faces of friends and family. In this case, the actions may be taken based on whether the people are recognized as known or authorized people for the hotel room.

The illustration of hotel environment 100 and the different components that may be used in hotel environment 100 in FIG. 1, anticipatory room entry system 200 in FIG. 2, and hotel environment 300 in FIG. 3 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, a receiver in receivers 330 in sensors 324 for door locks 306 may be a single component or may be integrated as part of a transceiver or used with a transmitter. The receiver may be located in a door lock or may be a location proximate to or nearby a door lock such that information may be received from a digital key hotel mobile application.

Figure 4:
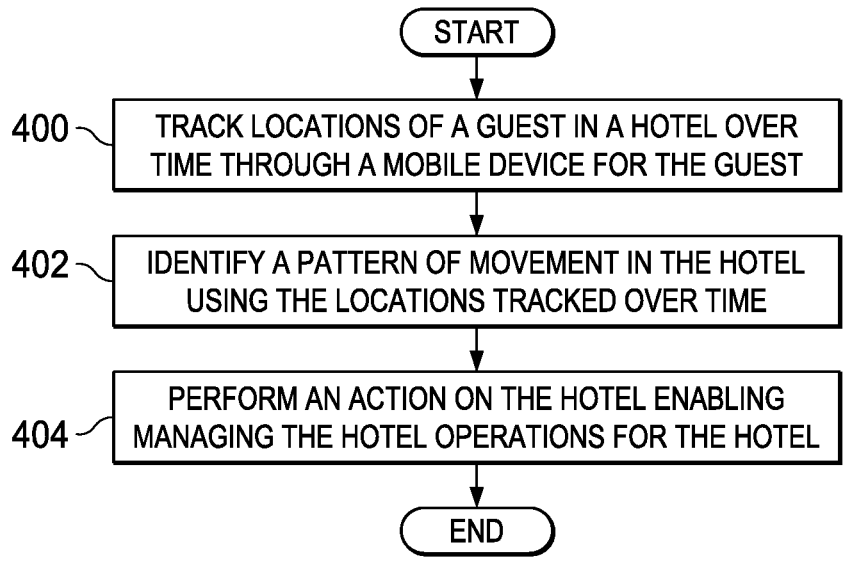
FIG. 4 is a flowchart of a process for managing a hotel in accordance with an illustrative embodiment.

Turning next to FIG. 4, a flowchart of a process for managing a hotel operations is depicted in accordance with an illustrative embodiment. The process illustrated in FIG. 4 may be implemented using program code stored on a computer-readable storage media in which the program code is transferred for processing by a processor unit in a hotel computer system or other type of data processing system. The process illustrated in this figure may be implemented in arrival manager 120 in FIG. 1, arrival manager 202 in FIG. 2, and arrival manager 314 in FIG. 3.

The process begins by tracking locations of a guest in a hotel over time through a mobile device for the guest (step 400). In other words, the location of the guest is based on the location of the mobile device.

The process identifies a pattern of movement in the hotel using the locations tracked over time (step 402). The pattern of movement includes a number of different types of information. For example, the pattern of movement may include a path, a direction, locations, and other suitable types of information. As another example, the pattern of movement also may include a speed along each section of a path between locations, as well as timestamps of when the guest was detected at the different locations. In this illustrative example, the section of a path is the distance between two locations in the pattern of movement.

Further, in identification of features such as elevators, stairs, and other structures in the hotel, may be used to further determine when a guest will reach a hotel room. For example, if the guest travels from the first floor to the sixth floor in an elevator, the amount of time for the elevator to move the guest from the first floor to the sixth may be used to increase accuracy in predicting when the guest will reach the hotel room. Further, the arrival manager in the illustrative example may take into account how many other guests are entering the elevator and their hotel rooms. With hotel rooms, the arrival manager may predict stops that may occur prior to the guest reaching the sixth floor. If this type of information is unavailable, then an average time for moving the elevator between these floors may be used. The average time may vary depending on the time of day, such as rush-hour, late-night, or other times.

With knowing the speed of travel of the guest along different sections of a path predicting the arrival of the guest at the hotel room may be made with greater accuracy. Further, the pattern of movement may be compared with a history of patterns of movement in predicting when the guest will arrive at a hotel room. Further, as the guest becomes closer and closer to the hotel room, the time of arrival may be predicted more accurately and updated. In other words, this process may be performed while the guest is moving along the path in the pattern of movement.

The process performs an action in the hotel enabling managing the hotel operations for the hotel (step 404). The process terminates, thereafter. The action may be performed in a more timely manner based on detecting the pattern movement with increased accuracy. For example, the action may include controlling the heating and air-conditioning system to change the temperature of the room to reach a pre-selected temperature just prior to the guest reaching the hotel room. In another illustrative example, the action may be to start operation of the coffee machine, such that hot coffee is ready when the guest reaches the hotel room.

Figure 5:
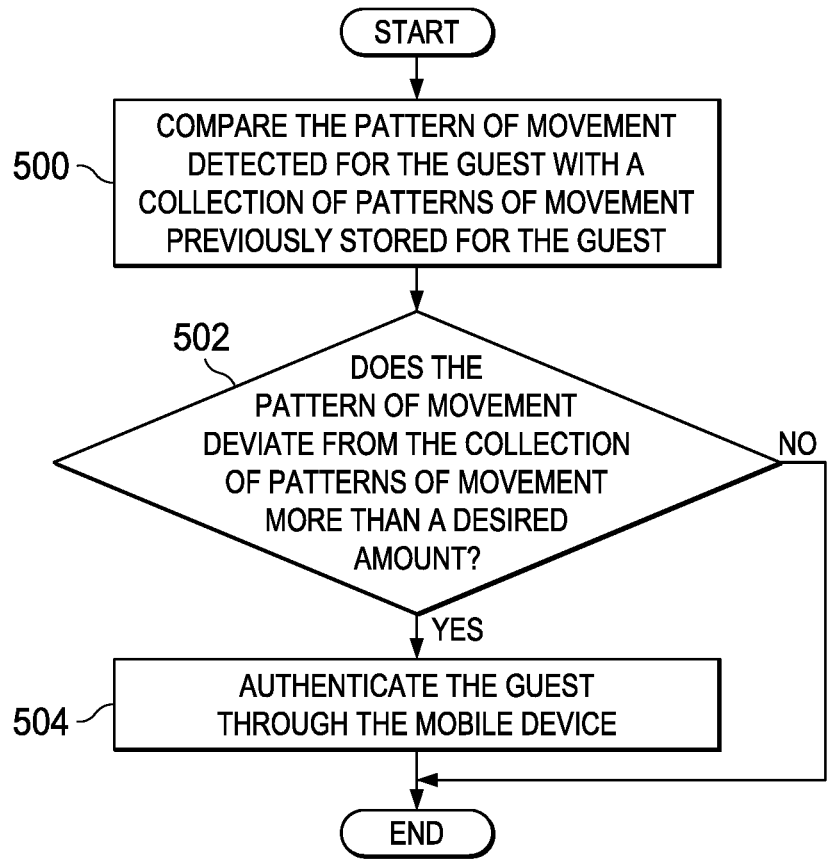
FIG. 5 is a flowchart of a process for performing actions in a hotel in accordance with an illustrative embodiment.

With reference next to FIG. 5, a flowchart of a process for performing actions in a hotel is depicted in accordance with an illustrative embodiment. The process illustrated in FIG. 5 is example of one implementation for step 404 in FIG. 4.

The process begins by comparing the pattern of movement detected for the guest with a collection of patterns of movement previously stored for the guest (step 500). A determination is made as to whether the pattern of movement deviates from the collection of patterns of movement more than a desired amount (step 502). In step 502 the comparison to the collection of patterns of movement they be performed indirectly. For example, the comparison to the collection of patterns of movement may be comparing the detected pattern of movement with an expected pattern of movement that is derived from the collection of patterns of movement. In a hotel with a circular shape, a guest may stay in a hotel room that is about halfway around from the elevator. The guest may go left from the elevator or right from their hotel room to reach the elevator in the same amount of time. With this situation, both patterns of movement may be normal and either may be considered within the amount of deviation allowed. In other words, the deviation may include having more than one pattern of movement. Additionally, a percentage threshold may be used to determine whether deviation from a particular pattern of movement is acceptable.

If the pattern of movement deviates from the collection of patterns of movement more than a desired amount, the process authenticates the guest through the mobile device (step 504). The process terminates thereafter. In step 504, the process performs authentication steps to ensure that the user of the mobile device is the correct guest for a particular room that is to be unlocked.

With reference again to step 502, if the pattern of movement does not deviate from the collection of patterns of movement more than a desired amount, the process terminates. In this case, the user of the mobile device is assumed to be a guest.

Figure 6:
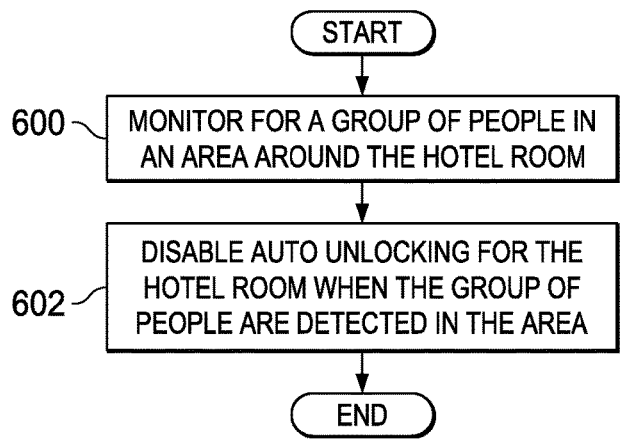
FIG. 6 is a flowchart of a process for controlling unlocking a hotel room in accordance with an illustrative embodiment.

In FIG. 6, a flowchart of a process for controlling unlocking of a hotel room is depicted in accordance with an illustrative embodiment. The process illustrated in this flowchart may be implemented as additional steps in the flowchart in FIG. 4. These additional steps maybe performed by running program code in arrival manager 120 in FIG. 1, arrival manager 202 in FIG. 2, or action identifier 210 in FIG. 2.

The process begins by monitoring for a group of people in an area around the hotel room (step 600). As used herein, a "group of" when used with reference to items means one or more items. For example, "a group of people" is one or more people.

The monitoring in step 600 may be performed by generating images from cameras in the hotel. Object recognition may be performed to identify people in images to determine whether the group of people are present in an area.

The process disables auto unlocking for the hotel room when the group of people are detected in the area (step 602). The process terminates thereafter. Step 602 is an example of performing an action in the hotel that enables managing hotel operations for the hotel.

Figure 7:
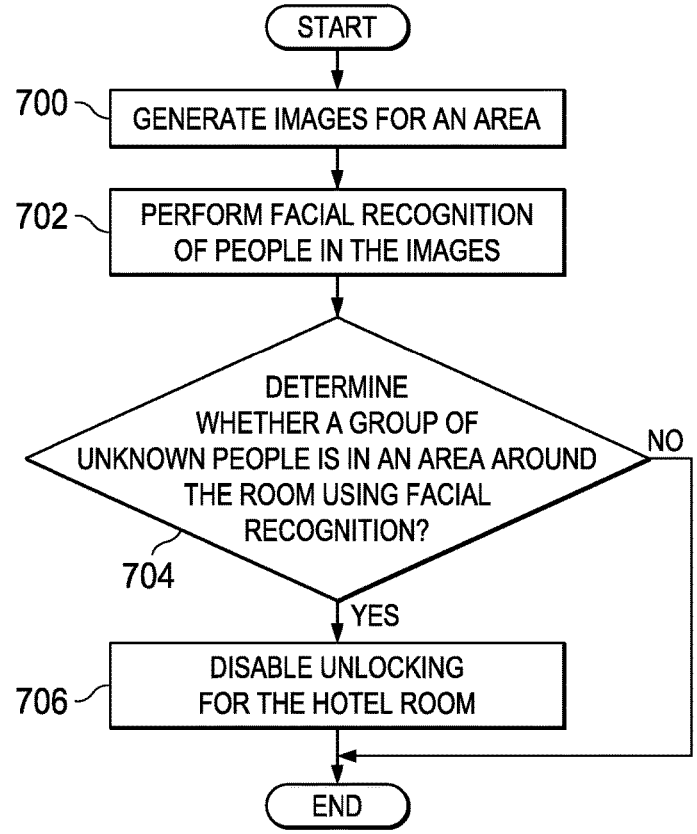
FIG. 7 is a flowchart of a process for monitoring a group of unknown people in a hotel in accordance with an illustrative embodiment.

With reference next to FIG. 7, a flowchart of a process for monitoring a group of unknown people in a hotel is depicted in accordance with an illustrative embodiment. The process illustrated in this flowchart may be implemented as additional steps in the flowchart in FIG. 4. These additional steps maybe performed by running program code in arrival manager 120 in FIG. 1, arrival manager 202 in FIG. 2, or action identifier 210 in FIG. 2.

The process begins by generating images for an area (step 700). Step 700 may be performed using a sensor, such as a camera in the hotel. The process performs facial recognition of people in the images (step 702). In step 702, the images are compared to a database of images for known people. These known people in the database may be, for example, at least one of hotel personnel, a manager, a hotel guest, an authorized contractor, or some other person that is authorized to be in the hotel. Further, whether the person is considered an unknown person also may be based on whether that person is authorized to be in a particular location in which the image was taken. In other words, the person identified through facial recognition may be part of hotel personnel but not authorized to be in the particular location. In that case, the person is considered an unknown person.

The process determines whether a group of unknown people is in an area around the room using facial recognition (step 704). Step 700, step 702, and step 704 are performed to monitor for the group of unknown people in an area around the hotel room. As used herein, a "group of" when used with reference to items means one or more items. For example, a group of unknown people is one or more unknown people.

If the group of people is detected in the area, then the process disables unlocking for the hotel room (step 706) with the process terminating thereafter. If a group of unknown people are not in the area, the process terminates. The steps may be performed in addition to or in place of step 706. For example, alert may be sent to security for the hotel when a group of unknown people are detected.

Figure 8:
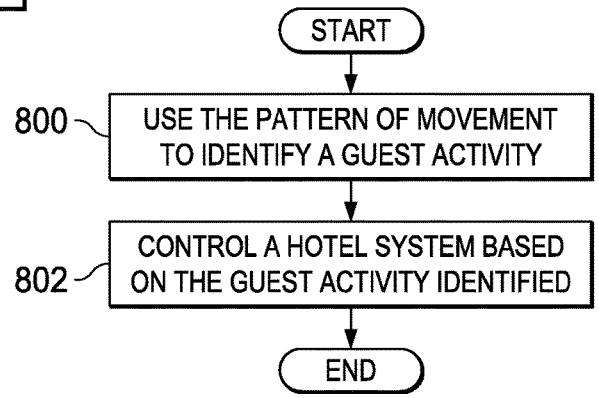
FIG. 8 is a flowchart of a process for controlling hotel systems using a pattern movement in accordance with an illustrative embodiment.

With reference next to FIG. 8, a flowchart of a process for controlling hotel systems using a pattern movement is depicted in accordance with an illustrative embodiment. The process in FIG. 8 is an example of an action that may be taken in step 404 in FIG. 4.

The process begins by using the pattern of movement to identify a guest activity (step 800). For example, the pattern of movement may show the guest moving from a pool to their room. The guest activity may have been swimming, which has now been completed. In another example, the pattern may show the guest moving from the room to a gym in the hotel. In this example, the guest activity may be a workout that is about to begin.

The process controls a hotel system based on the guest activity identified (step 802), with the process terminating thereafter. The hotel system may be, for example, a heating and air-conditioning system. If the guest is moving from the pool to the room, a temperature may be raised to a level that provides comfort to the guest.

In another example, when the activity is a workout that is about to begin after the guest has left the room, the heating and air condition may be turned off or changed to reduce the consumption of energy while the guest away. When a pattern of movement shows that the guest is returning from an activity, the heating and air-conditioning system may be changed to provide a desired temperature for the guest. In another example, an arrival manager may determine that a guest is returning from an activity such as skiing. With this activity, the arrival manager may determine that the guest likes the temperature of the hotel room to be at a higher temperature when returning from skiing than at other times. The arrival manager may also identify that the guest desires to have coffee when returning to the hotel room and may start the coffee maker to have the coffee prepared for the guests return to the room. The tracking of the movement of the guest may include tracking the guest outside of the hotel. Otherwise, the tracking may begin as the guest returns to the hotel.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
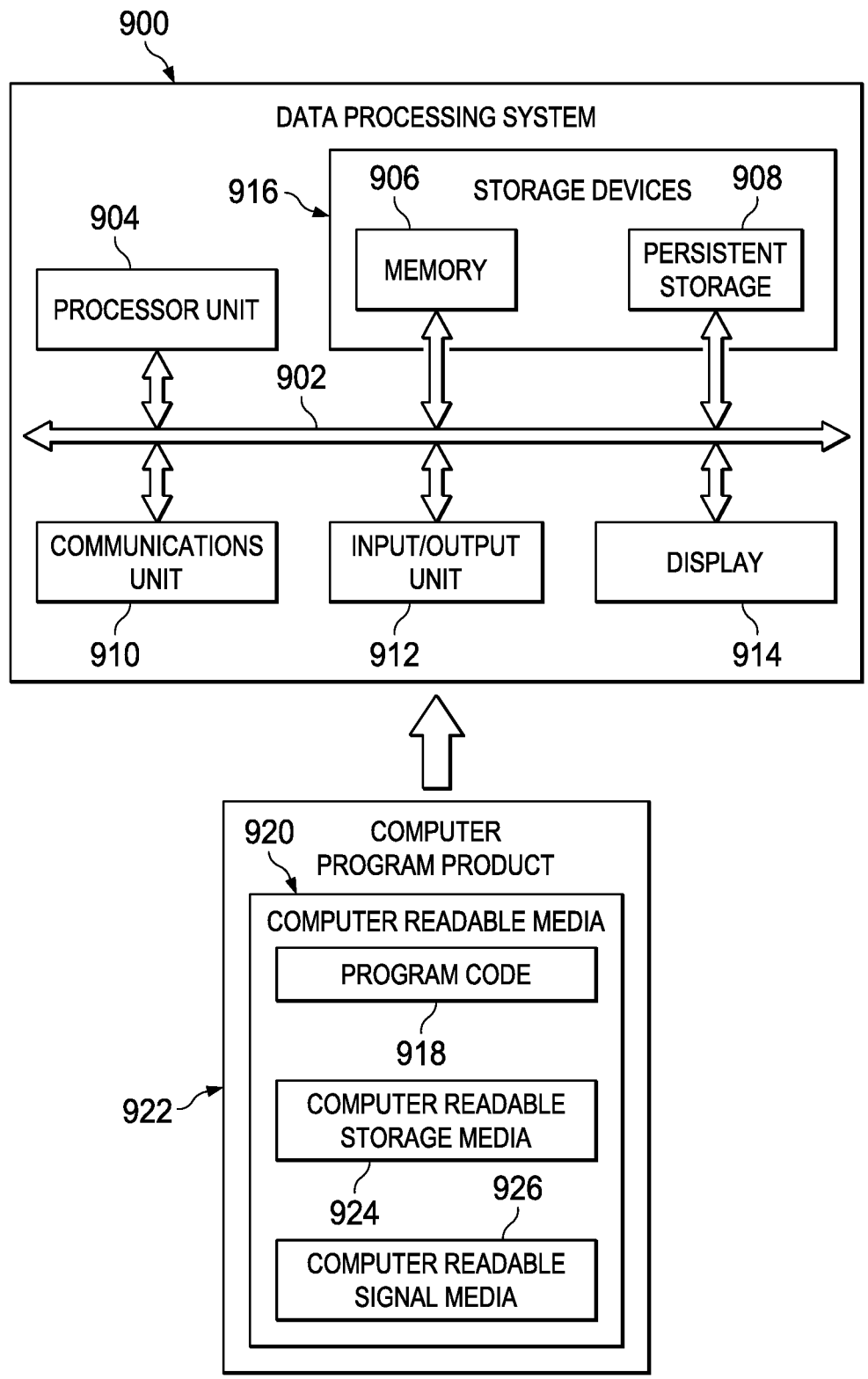
FIG. 9 is a block diagram of a data processing system in accordance with an illustrative embodiment.

Turning now to FIG. 9, an illustration of a block diagram of a data processing system is depicted in accordance with an illustrative embodiment. Data processing system 900 may be used to implement hotel computer system 112 in FIG. 1, mobile device 126 in FIG. 1, mobile device 224 in FIG. 2, hotel computer system 312 in FIG. 3, and mobile devices 326 in FIG. 3. In this illustrative example, data processing system 900 includes communications framework 902, which provides communications between processor unit 904, memory 906, persistent storage 908, communications unit 910, input/output unit 912, and display 914. In this example, communications framework may take the form of a bus system.

Processor unit 904 serves to process instructions for software that may be loaded into memory 906. Processor unit 904 may be a number of processors, a multi-processor core, or some other type of processor, depending on the particular implementation.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a solid state hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code, that may be read and run by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918, rather than a medium that propagates or transmits program code 918.

Alternatively, program code 918 may be transferred to data processing system 900 using computer-readable signal media 926. Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

Thus, illustrative embodiments of the present invention provide a computer implemented method, computer system, and computer program product for managing operations in a hotel. In one illustrative example, a process implemented in a hotel computer system tracks locations of a guest in a hotel over time through a mobile device for the guest, identifies a pattern of movement in the hotel using the locations tracked over time, and performs an action in the hotel enabling managing the hotel operations for the hotel.

The process may be used to more accurately identify when a guest will arrive at a room. For example, in tracking the pattern of movement, the speed at which the guest travels in the pattern of movement may be used to more accurately predict when the guest will reach the hotel. This room may be a hotel room or some other suitable type of room, such as a conference room, a dining room, a pool, a gym, or other suitable locations in a hotel. With the pattern of movement, the arrival time also may be determined when the speed at which the guest travels is identified from location information. In the illustrative examples, the location information may include timestamps along with actual locations or identifiers of sensors that may be used to determine where the guest is located.

With this information, hotel systems may be started or stopped based on the patterns of movement. For example, appliances or other devices may be started for the guest prior to the guest returning to their room. In one illustrative example, a coffee maker may be started prior to the guest returning to the room, such that hot coffee is ready when the guest enters. In another illustrative example, a temperature in an air-conditioning unit may be adjusted to provide a desired temperature for the guests when the guest returns to their room. These types of actions, in addition to unlocking doors, may be performed to enhance the experience of guests in the hotel. Further, with the ability to adjust or turn on and off appliances and other hotel systems, energy savings may be realized for when those devices are not needed.

Further, as described in the illustrative examples the patterns of movement may be stored to form a history for a guest. If a current pattern of movement for the guest deviates from the known pattern or history, then the guest may be requested to re-authenticate to ensure that the device is being used by the guest and not another person. In yet another example, when people are within a selected distance of a room, a door may not automatically unlock as the guest approaches or the door may lock when it is currently unlocked. This type of process may be initiated or used as an option by the guest. Further this feature may be overridden through further authentication.

Also, image analysis may be used from images generated by sensors, such as cameras. The image analysis may include facial analysis to determine whether people in the proximity of the room are unknown people. Unknown people are people who are not authorized and should not be in the area or have access to the room.

Further, as described herein the patterns of movement may be used over time to identify activities in which the guest engages. Identifying these activities, hotel systems may be managed to enhance the experience of the guest in the hotel. For example, different hotel systems may be controlled. For example, if the pattern of movement shows that a guest has entered the hotel from outside of the hotel and is moving towards their hotel room, the room may be adjusted to increase the temperature if the temperature outside of the hotel has been cold. Additionally, the coffee machine may be started, such that coffee is ready for the guest when the guest returns to the hotel room, if the guest typically wants coffee when returning from a particular location or activity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function or functions. It should also be noted that, in some alternative implementations, the functions noted in the blocks may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A method for managing hotel operations using a mobile device for a guest of the hotel, the method comprising:
    tracking, by a hotel computer system, locations of the guest in the hotel over time through the mobile device for the guest;
    identifying, by the hotel computer system, a pattern of movement of the guest in the hotel using the locations tracked over time by identifying the locations of the guest over time from detecting the mobile device for the guest by receivers for door locks in the hotel, wherein identifying the locations of the guest over time comprises receiving from at least one of the receivers a receiver identifier that uniquely identifies the at least one receiver from other receivers of the receivers, a timestamp, and a token that the at least one receiver received from the mobile device that identifies the guest, wherein the pattern of movement indicates that the guest is moving to a hotel room for the guest;
    predicting an arrival time of when the guest will arrive at a hotel room of the guest based on the pattern of movement of the guest in the hotel that is identified using the locations of the guest in the hotel that are tracked over time;
    responsive to predicting when the guest will arrive at the hotel room of the guest, performing an action in the hotel enabling managing the hotel operations for the hotel based on the predicted arrival time;
    monitoring for a group of unknown people in an area around the hotel room;
    wherein performing the action in the hotel enabling managing the hotel operations for the hotel further comprises authenticating the guest using the token only when the pattern of movement deviates from an expected pattern of movement and disabling auto unlocking for the hotel room when the group of unknown people are detected in the area around the hotel room.

2. The method of claim 1, wherein identifying, by the hotel computer system, the pattern of movement of the guest in the hotel using the locations tracked over time comprises:
    identifying a path and a direction of a movement using the locations to form the pattern of movement; and wherein predicting the arrival time of when the guest will arrive at the hotel room of the guest comprises:
    comparing the pattern of movement with a collection of patterns of movement previously stored for the guest.

3. The method of claim 2 further comprising:
    adding the pattern of movement to the collection of patterns of movement for the guest.

4. The method of claim 1, wherein performing the action in the hotel enabling managing the hotel operations for the hotel comprises:
    using the pattern of movement to identify a guest activity; and
    controlling a hotel system based on the guest activity identified.

5. The method of claim 1 further comprising:
    using the mobile device by the guest to configure the action in the hotel.

6. A hotel computer system for managing hotel operations, the hotel computer system comprising:
    a processor unit; and
    an arrival manager that tracks locations of a guest in a hotel over time through a mobile device for the guest; identifies a pattern of movement of the guest in the hotel using the locations tracked over time by identifying the locations of the guest over time from detecting the mobile device for the guest by receivers for door locks in the hotel, wherein in identifying the locations of the guest over time, the arrival manager receives from at least one of the receivers a receiver identifier that uniquely identifies the at least one receiver from other receivers of the receivers, a timestamp, and a token that the at least one receiver received from the mobile device that identifies the guest, wherein the pattern of movement indicates that the guest is moving to a room for the guest; predict an arrival time of when the guest will arrive at a hotel room of the guest based on the pattern of movement of the guest in the hotel that is identified using the locations of the guest in the hotel that are tracked over time; performs an action in the hotel enabling managing the hotel operations for the hotel based on the predicted arrival time; and monitors for a group of unknown people in an area around the room; wherein in performing the action in the hotel enabling managing the hotel operations for the hotel, the arrival manager authenticates the guest using the token only when the pattern of movement deviates from an expected pattern of movement and disables auto unlocking for the room when the group of unknown people are detected in the area around the hotel room.

7. The hotel computer system of claim 6, wherein in identifying the pattern of movement of the guest in the hotel using the locations tracked over time, the arrival manager identifies a path and a direction of a movement using the locations to form the pattern of movement; and wherein in predicting the arrival time of when the guest will arrive at the hotel room of the guest, the arrival manager compares the pattern of movement with a collection of patterns of movement previously stored for the guest.

8. The hotel computer system of claim 7, wherein the arrival manager adds the pattern of movement to the collection of patterns of movement for the guest.

9. The hotel computer system of claim 6, wherein in monitoring for the group of unknown people in an area around the room, the arrival manager generates images for the area; performs facial recognition of people in the images; and determines whether the group of unknown people is in the area around the room using the facial recognition.

10. The hotel computer system of claim 6, wherein in performing the action in the hotel enabling managing the hotel operations for the hotel, the arrival manager uses the pattern of movement to identify a guest activity and controls a hotel system based on the guest activity identified.

11. A computer program product for managing hotel operations using a mobile device for a guest of the hotel, the computer program product comprising:
 a non-transitory computer-readable storage media;
 first program code, stored on the non-transitory computer-readable storage media, for tracking locations of the guest in the hotel over time through the mobile device for the guest;
 second program code, stored on the non-transitory computer-readable storage media, for identifying, by a hotel computer system, a pattern of movement of the guest in the hotel using the locations tracked over time by identifying the locations of the guest over time from detecting the mobile device for the guest by receivers for door locks in the hotel by receiving from at least one of the receivers a receiver identifier that uniquely identifies the at least one receiver from other receivers of the receivers, a timestamp, and a token that the at least one receiver received from the mobile device that identifies the guest, wherein the pattern of movement indicates that the quest is moving to a room for the quest;
 third program code, stored on the non-transitory computer-readable storage media, for predicting an arrival time of when the guest will arrive at a hotel room of the guest based on the pattern of movement of the guest in the hotel that is identified using the locations of the guest in the hotel that are tracked over time; and
 fourth program code, stored on the non-transitory computer-readable storage media, for performing an action in the hotel enabling managing the hotel operations for the hotel based on the predicted arrival time, wherein the fourth program code comprises program code, stored on the non-transitory computer-readable storage media, for authenticating the guest using the token only when the pattern of movement deviates from an expected pattern of movement;
 fifth program code, stored on the non-transitory computer-readable storage media, for monitoring for a group of unknown people in an area around the room; and wherein performing the action in the hotel enabling managing the hotel operations for the hotel comprises program code, stored on the non-transitory computer-readable storage media, for disabling auto unlocking for the room when the group of unknown people are detected in the area around the hotel room.

\* \* \* \* \*